(12) United States Patent
Tsuzura et al.

(10) Patent No.: US 6,515,247 B1
(45) Date of Patent: Feb. 4, 2003

(54) GAS INSULATED SWITCHGEAR

(75) Inventors: Keiichi Tsuzura, Hitachi (JP);
Kazuhiko Takahashi, Hitachi (JP);
Junzo Kida, Hitachi (JP); Minoru Yabuki, Tokai-mura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/830,341

(22) PCT Filed: Apr. 5, 1999

(86) PCT No.: PCT/JP99/01795
§ 371 (c)(1),
(2), (4) Date: Apr. 26, 2001

(87) PCT Pub. No.: WO00/25401
PCT Pub. Date: May 4, 2000

(30) Foreign Application Priority Data

Oct. 27, 1998 (JP) .......................................... 10-305012

(51) Int. Cl.⁷ ......................... H01H 33/18; H01H 33/70

(52) U.S. Cl. ........................................ 218/43; 361/601
(58) Field of Search .......................... 218/43, 7, 9–10, 218/13–14; 361/601, 612

(56) References Cited

U.S. PATENT DOCUMENTS 5,898,565 A * 4/1999 Yamauchi et al. ............ 337/28

* cited by examiner

*Primary Examiner*—Elvin Enad
*Assistant Examiner*—M Fishman
(74) *Attorney, Agent, or Firm*—Mattingly, Stanger & Malur, P.C.

(57) ABSTRACT

A compact-sized gas insulated switchgear accommodates components and devices constituting its line side unit into one container. Arresters and cable heads are accommodated in a lower section of the line side unit, and a circle connecting centers of respective arresters and cable heads arranged therein is concentric with a cylindrical section of the line side unit container.

10 Claims, 3 Drawing Sheets

GAS INSULATED SWITCHGEAR

BACKGROUND OF THE INVENTION

The present invention relates to a gas insulated switchgear, and in particular, to a compact gas insulated switchgear which can minimize a line-side unit and is suitable for installation thereof.

A gas insulated switch-gear apparatus is comprised of a breaker, disconnector, earthed-switch-gear, instrumental current transformer and the like as well as conductors for electrically connecting therebetween which are accommodated in a plurality of hermetically sealed containers which are filled with insulation gas. Because of its advantages and excellent properties suitable for provision of a compact size, insulation property and safety handling, it is installed widely in various electrical stations such as substations and the like.

A prior art of such a gas insulated switch-gear is disclosed, for example, in JPA Laid-Open No. 10-75513, 1997. Japan Electrical Society National Convention No.1592, which is comprised of accommodating a connecting conductor, a disconnector connected to the connecting conductor, a cable head connected to the disconnector, an arrestor one end of which is connected between the disconnector and the cable head, and a single phase voltage transformer one terminal of which is connected between a disconnector which is provided for one of the three phases and the cable head.

Further, other related arts are also disclosed in JPA Laid-Open Nos. 60-197106, 60-187217 and 60-183908, which comprise arrestors and cable heads which are arranged in close proximity therebetween in an isosceles triangle in the lower direction of the line-side unit thereof.

Conventional gas insulated switch-gears referred to above have attempted, in order to provide for a compact-sized apparatus, to reduce the size of apparatus and/or simplify the structure thereof by accommodating a plurality of devices in one unit on the line side among plural hermetically sealed container units. However, there is such a problem that because its arrestor which is one of components and is connected to an earthing line is disposed in the upper direction of the sealed container on the line side, a length of the earthing line becomes substantially long, thereby causing an operating potential of the arrestor to become higher. Further, in order to monitor a frequency of operation of the arrestor or the like, a weather protective box for housing a monitoring device must be provided external of the sealed container.

Still further, in the related art disclosed in JPA Laid-Open Nos. 60-197106, 60-187217, 60-183908, three-phase arrestors and cable heads are disposed in proximity to each other, therefore, there arise such problems that its construction becomes very complicated because of complicated connection necessitated for connecting of internal conductors and of external provision of a potential transformer, that because some cable head is also disposed toward the circuit breaker unit, it takes a substantial time in assembling a potential transformer, etc., and that minimization of the earthing line has not been taken into consideration.

A first object of the invention is to provide for a compact-sized gas insulated switchgear apparatus, which is accomplished by assembling a plurality of line side components and parts in one sealed container on the side of the line.

A second object of the invention is to provide for a compact-sized gas insulated switchgear apparatus wherein its earthing line connected to its arrestor can be minimized, and a monitoring device is installed under a sealed tank of the line side unit.

SUMMARY OF THE INVENTION

A gas-insulated switch-gear apparatus for accomplishing the aforementioned objects of the invention has a feature that the same is comprised of: a bus bar unit; a circuit breaker unit; and a line-side unit, wherein arrestors are disposed in the lower direction and toward the circuit-breaker unit within the line-side unit, and cable heads are disposed on the opposite side from the circuit breaker unit therein while in the upper direction therein, line-side dicsconnectors and a potential transformer are accommodated, and wherein these arrestors and cable heads are arranged approximately concentrically. Further, the same has such features that line side disconnectors, arrestors, potential transformer, and cable heads are accommodated advantageously within the line side unit, that three-phase circuit breakers accommodated within the circuit breaker unit are disposed linearly aligned, and that a surface section of exhaust cylinder of the circuit breaker in the direction of its linear alignment is formed flat in part.

Still further, the arrestors and the cable heads disposed in the lower part within the line side unit wherein also the line side disconnectors and the potential transformer are accommodated in the upper direction thereof are connected with circuit breakers within the circuit breaker unit via an insulation spacer using connection conductors, and wherein the line side disconnectors aligned linearly are disposed between the insulation spacer and the arrestors.

Still more, the connecting conductors for connecting the circuit breakers in the circuit breaker unit with the arrestors and the cable heads accommodated in the lower part of the line side unit which also accommodates the line side disconnectors and the potential transformer in the upper part thereof have a horizontal section in a part for connecting the arrestors and the cable heads and a vertical section in a part for connecting between the circuit breakers and the arrestors, and wherein the line side disconnectors are installed on the connecting conductors in the vertical section thereof.

Still further, in the upper direction of the cable heads, there are provided earthing devices which are aligned linearly, and further the potential transformer is disposed above these earthing devices. The arresters and cable heads are arranged along a periphery of the container in the line side unit. Two arrestors and two cable heads of a same phase are arranged in proximity. Earthing lines of the arresters and a monitor device are placed in the bottom direction below the line side unit.

Further, the line side unit of the gas insulated switch-gear apparatus of the invention, which accommodates three phase arrestors and three phase cable heads in the lower part therein, and the line side disconnectors as well as the potential transformer in the upper part therein, has such a feature that an arrestor and a cable head of the neutral phase are counter-positioned, that the other arrestors of the other phases are disposed on both sides of the neutral phase arrestor to form a first triangle between the counter-positioned neutral arrestor and the neutral cable head, and that the other cable heads of the other phases are disposed on both sides of the neutral phase cable head to form a second triangle therebetween, and wherein the second triangle is larger than the first triangle.

Still further, in the line side unit in the gas insulated switchgear apparatus of the invention, which accommodates the three phase arrestors and the three phase cable heads in the lower part therein and the line side disconnectors and the potential transformer in the upper part therein, the neutral phase arrestor and the neutral phase cable header are counter positioned opposite to each other in a virtual circle drawn within the line side unit. Then, another phase cable head, the neutral phase cable head, the other phase cable head, another phase arrestor, the neutral phase arrestor, and the other phase arrestor are arranged sequentially along the virtual circle.

Still more, in the triangle arrangements of the three phase cable heads and three phase arrestors described above, the triangle of the three phase cable heads is formed to be greater than that of the arrestors.

PREFERRED EMBODIMENT OF THE INVENTION

Figure 1:
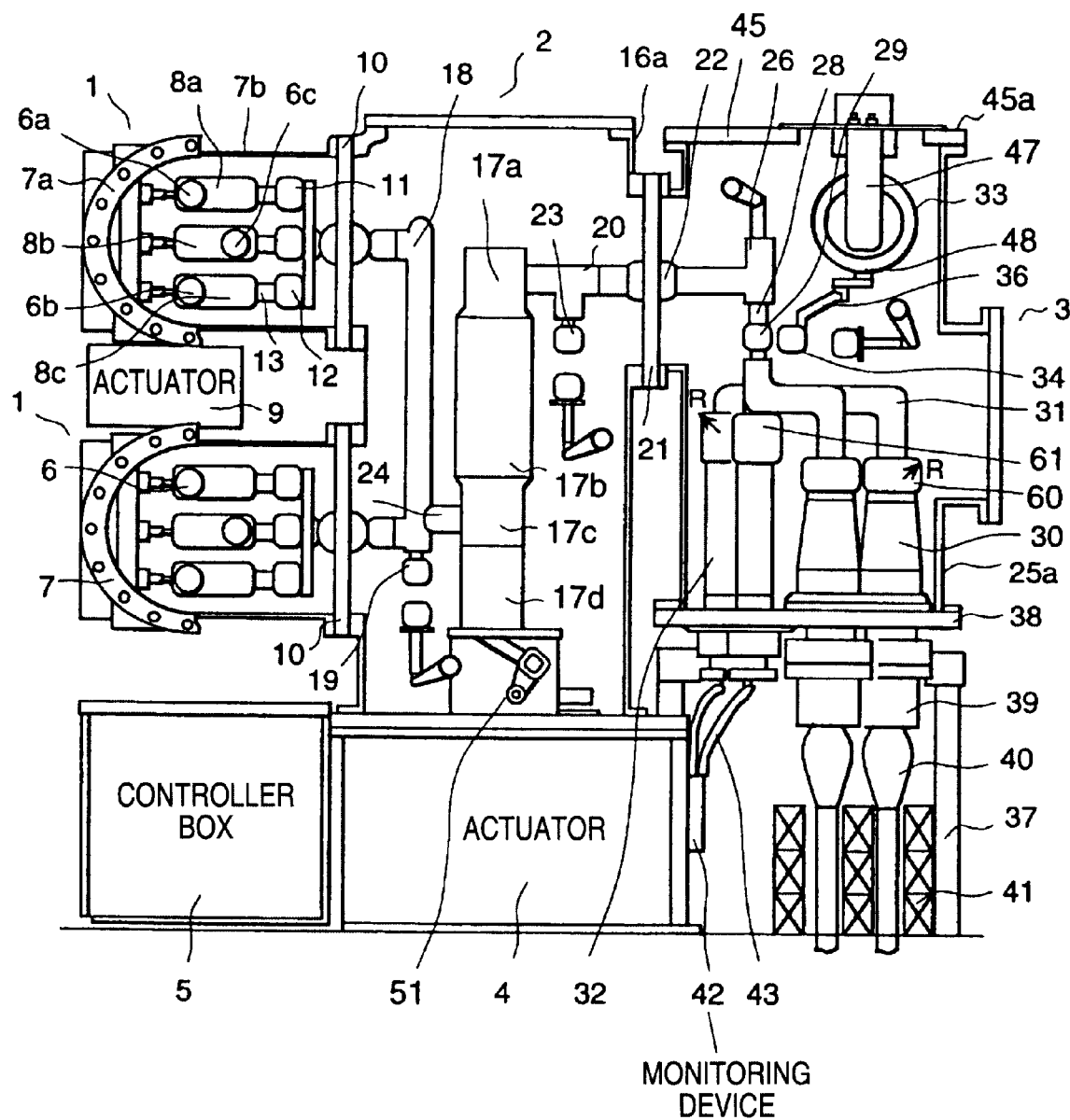
FIG. 1 is a vertical cross section of a gas insulated switchgear apparatus according to one embodiment of the invention.
Figure 2:
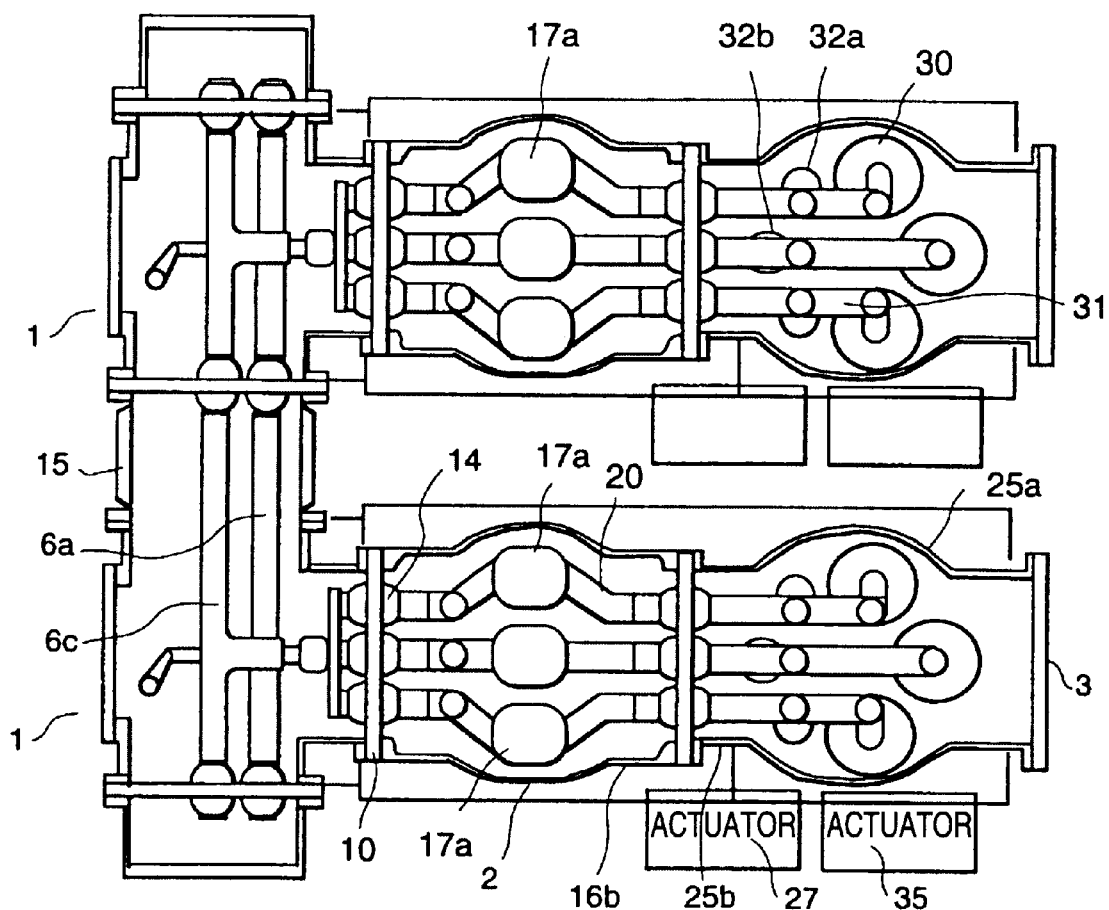
FIG. 2 is a lateral cross section of the gas insulated switchgear apparatus according to the one embodiment of the invention depicted in FIG. 1.

A preferred embodiment of the invention will be described with reference to FIGS. 1–4 in the following. A gas-insulated switchgear apparatus according to one embodiment of the invention is comprised of a bus bar unit 1, a circuit breaker unit 2 and a line side unit 3 as indicated in FIGS. 1 and 2. On one side of circuit breaker unit 2 there are provided two bus bar units 1 stacked vertically, and on the other side of circuit breaker unit 2 there is provided line side unit 3 connected therewith. In the lower direction of circuit breaker unit 2, an actuator 4 is disposed and on the side of which a controller box 5 is disposed. As shown in FIG. 1, in a space above the actuator 4 and controller box 5, the circuit breaker unit 2 and the bus bar units 1 stacked vertically are accommodated.

Each bus bar unit 1 has the following structure. In its bus bar container 7, bus bar conductors 6a, 6b, 6c of three phases are positioned at each apex of an isosceles triangle. Bus bar container 7 is comprised in combination of a cylindrical container section 7a which extends in an axial direction of bus bar conductor 6 and a cylindrical container section 7b which is perpendicular to the cylindrical container section 7a. Upper and lower bus bar conductors 6a and 6b are positioned vertically relative to a center line of cylindrical container section 7a, and bus bar conductor 6c is positioned on the center line thereof and toward circuit breaker unit 2. On both sides of cylindrical container section 7a. of bus bar container 7, there are provided a flange, and to one end thereof, an expansion joint 15 is connected, which is formed into bellows. Respective branch conductors 8a, 8b, 8c of bus bar conductors 6a, 6b, 6c are disposed linearly aligned in a vertical direction in a center portion of cylindrical container section 7b. A movable electrode 13 is provided in a center portion of each of branch conductors 8a, 8b, 8c, which movable electrode 13 is driven by an actuator 9 disposed between the two bus bar containers 7 to reciprocate within each of branch conductors 8a, 8b, 8c. A stationary electrode 12 is fixed via a conductor 11 to an insulation spacer 10 provided between bus bar unit 1 and circuit breaker unit 2. Movable electrode 13 and stationary electrode 12 constitute a disconnector. A gas-tight insulation spacer 10 is provided between vertically stacked bus bar units 1 and circuit breaker unit 2, respectively. In this insulation spacer 10, conductor joints 14 are provided linearly aligned in a horizontal direction along a centerline thereof for providing connection with conductor 18 within the circuit breaker unit.

Circuit breaker unit 2 of the invention is arranged as follows. A container of circuit breaker unit 2 is comprised of cylindrical container section 16a having its axial line in a vertical direction, cylindrical container section 16b formed on both sides in a horizontal direction in an upper portion of the cylindrical container section 16a, and cylindrical container section 16b formed in a lower portion thereof in a horizontal direction toward the bus bar unit. In a portion along a center line of cylindrical container section 16a, circuit breakers 17 corresponding to three phases are aligned in parallel with the axial line of bus bar conductors 6.

A conductor joint 14 provided in insulation spacer 10 in the upper direction and a conductor joint 14 provided in insulation spacer 10 in the lower direction are connected by a reciprocating conductor 18, a lower portion of which is connected to a lower portion of circuit breaker 17 via conductor 24.

In the lower direction of reciprocating conductor 18, a stationary electrode 19 of the earthing device is provided to be able to make contact with or disconnect from a movable electrode to be driven by an actuator (not shown) provided external of the container of circuit breaker unit 2.

In an upper portion of each circuit breaker 17, a joint conductor 20 is provided. This joint conductor 20 is connected with one of conductor joints 22 which are aligned linearly in a horizontal direction in insulation spacer 21 which is disposed between circuit breaker unit 2 and line side unit 3. Further, joint conductor 20 is provided with a branch section on the side of the circuit breaker, and a stationary electrode 23 of the earthing device is provided on its end. This stationary electrode 23 makes contact with and separates from a movable electrode which is driven reciprocally by an actuator (not indicated) which is provided external of the container of circuit breaker unit2.

A branch section suspending downward, which is provided for joint conductor 20 and stationary electrode 23, is provided on its end portion for the earthing device. This stationary electrode 23 and the movable electrode to be driven reciprocally by the actuator which is provided external of the container of circuit breaker unit 2 constitute the earthing device.

Here, one of the circuit breakers 17 which is in the center thereof is disposed on a line drawn connecting between a conductor joint 14 at a center in insulation spacer 10 and a conductor joint 22 at a center in insulation spacer 21. Other circuit breaker 17 disposed on both sides of this center-positioned circuit breaker 17 are placed outside respective lines connecting between their corresponding conductor joints 14 and 22 in order for their insulation distance to be maintained. Therefore, their conductors 24 are connected outwardly. Further, although each circuit breaker is formed basically in a cylinder, surfaces thereof facing the other circuit breakers in the direction of the linear arrangement are formed into a flat surface in part in order to reduce a size in the direction of the linear alignment. Upper portions of respective circuit breaker 17 are connected to conductor joints 22 which are aligned linearly in a horizontal direction in insulation spacer 21 which is provided between circuit breaker unit 2 and line side unit 3.

As indicated in FIG. 1, circuit breaker 17 is comprised of: exhaust cylinder 17c which is fixed via insulated support member 17d in the upper direction of a link mechanism 51 which is coupled with actuator 4; insulation cylinder 17b placed on exhaust cylinder 17c; and exhaust cylinder 17a disposed on insulation cylinder 17b. Three phase circuit breakers 17 are disposed linearly, however, because exhaust cylinder 17c has a built-in conductor, insulation cylinder 17b has a built-in circuit breaker, their major diameters become large. Further, because exhaust cylinders 17a and 17c have a flange for fixing with insulation cylinder 17b using bolts, their major diameter inevitably become large. Therefore, as indicated in FIG. 2 according to the invention, a portion of the surface of any circuit breaker 17 which is adjacent to the surface of neighboring circuit breaker 17 is formed flat, and a portion of the flange on the side of the other portion of the surface thereof which is cylindrical and remote from the neighboring circuit breaker is used for fixing via bolts between exhaust cylinder 17a or 17c and insulation cylinder 17b, thereby ensuring for an adequate insulation distance to be maintained between the three phase circuit breakers 17 in a minimal dimension, thereby minimizing a major diameter of the circuit breaker unit 2.

Line side unit 3 of the invention has the following arrangement. A container of line side unit 3 is comprised of a cylindrical container section 25a in a vertical direction, and cylindrical container section 25b formed in a horizontal direction in an upper portion of the cylindrical container section 25a. Conductor 26 therein is connected to conductor joint 22 provided in insulation spacer 21. This conductor 26 includes a horizontal portion extending linearly in a horizontal direction from conductor joint 22 and a vertical portion suspending linearly. In the vertical portion of conductor 26 extending in the vertical direction, disconnectors corresponding to three phases are aligned linearly. Each disconnector is provided with a movable electrode 28 which is driven in vertical directions by actuator 27 provided outside the container of line side unit 3. Movable electrode 28 is coupled with an insulation pole which moves reciprocally in a hole provided through a center portion of conductor 26. A stationary electrode 29 is fixed on conductor 31 which is connected with cable head 30 which is disposed in the lower direction within cylindrical container section 25a and opposite to the circuit breaker unit. Arrester 32 is disposed in a lateral direction of cable head 30 and toward circuit breaker unit 2, and this cable head 30 and its associated arrester 32 are connected via a common conductor 31. Conductor 28 disposed in the upper direction and in proximity with conductor 31 is provided with stationary electrode 34 of an earthing device which makes contact with a movable electrode which is driven by actuator 35 provided external of the container of line side unit 3. In the upper direction of cable head 30 and above the earthing device, a potential transformer 33 is disposed. Potential transformer 33 and conductor 26 are disengaged from each other by means of separator 36.

As for potential transformer 33, a top cover 45 having a circular opening 45a therein is fastened with bolts to the upper portion of cylindrical container section 25b, and through this opening 45a, potential transformer 33 can be inserted inside the chamber. This potential transformer 33 is comprised of shield section 46 having built-in winding, core section 47 and voltage pick-up terminal 48.

Figure 3:
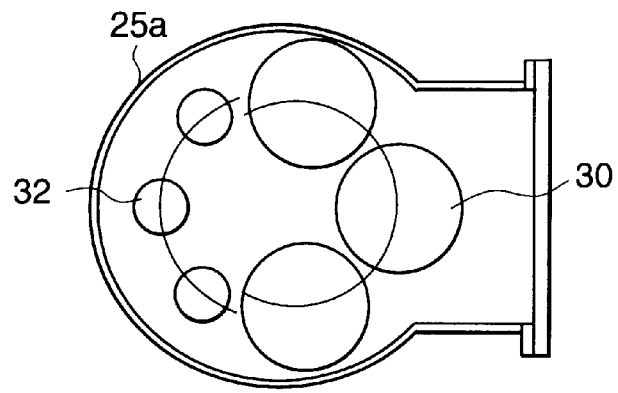
FIG. 3 is a lateral cross section of a line side unit of the one embodiment of the invention.

A bottom plane of the line side unit is indicated in FIG. 3. As shown in this figure, three arrestors 32 and three cable heads 30 corresponding to three phases are disposed approximately concentrically within cylindrical container section 25a, and in particular, three phase cable heads 30 are arranged opposite to the circuit breaker unit 2 and the three phase arrestors 32 are arranged in proximity of circuit breaker unit 2. Because of this arrangement of the cable heads toward the external side, efficiency of fieldwork when installing current transformer 41 is improved.

Figure 4:
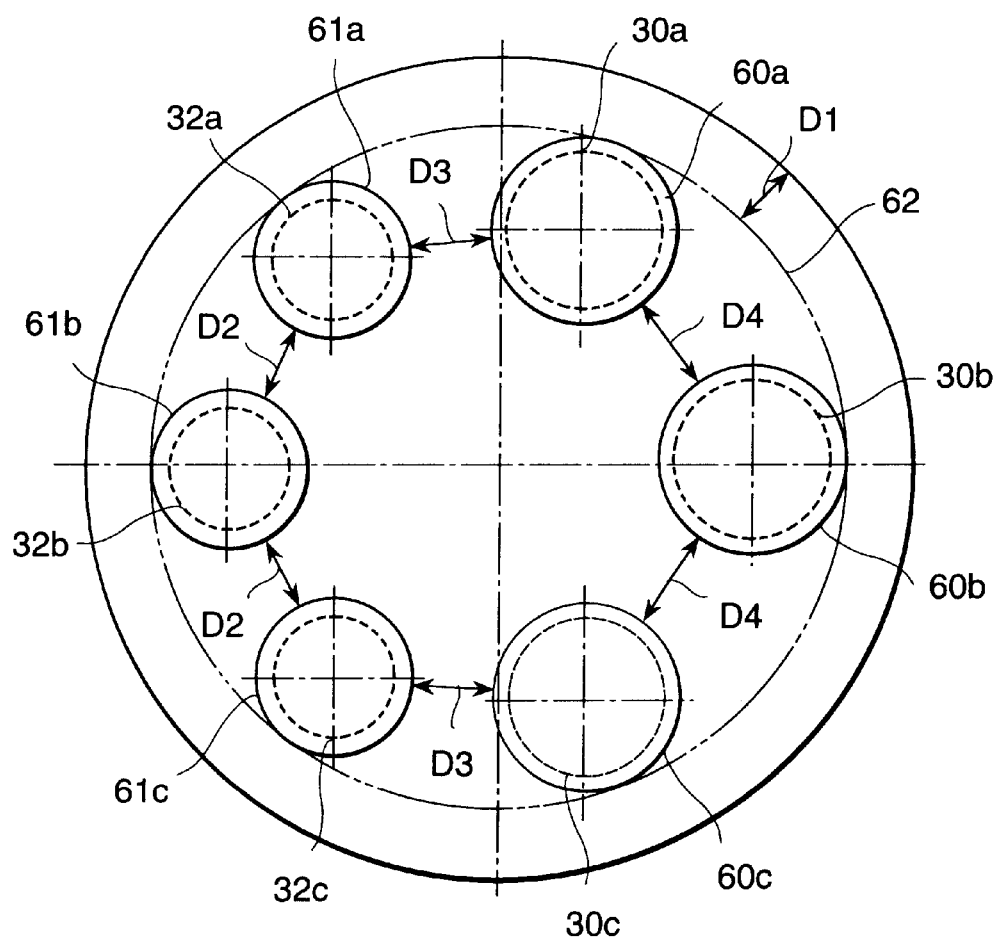
FIG. 4 shows an arrangement of arrestors and cable heads according to one embodiment of the invention.

A major diameter of the cylindrical container of line side unit 3 is formed substantially the same as a major diameter of the cylindrical container of circuit breaker 2. Arrangements of cable heads 30 and arresters 32 disposed within line side unit 3 are determined as follows. Each cable head 30 has a conical trapezoid form, and is provided with shield 60 on the top of its conical trapezoid as indicated in FIG. 4. Further, shield 61 is also provided on the top of each arrester 32. These shields 60, 61 are formed to have a curvature with a radius of R at the corner thereof. An insulation distance is determined by a value of this radius R. In order to ensure for an anti-ground insulation distance to be maintained between these shields 60, 61 and an internal surface of the cylindrical container of line side unit 3, a distance D1, for example, of 60 mm is separated between these shields 60, 61 and the internal surface of the cylindrical container for provision of an insulation distance. Cable head 30 of neutral phase and arrester 32 of neutral phase of the three phases are counter-positioned. In order to ensure an adequate insulation distance between respective cable heads 30 of the three phases, a maximum distance of 120 mm is ensured between shields 60, and the other two cable heads 30 are arranged on both sides of the neutral phase cable head 30 in a triangle at a distance of D4 therefrom within the maximum range of insulation. In order to ensure for an insulation distance to be maintained between three phase arresters, the other two arresters are arranged on both sides of the neutral phase arrester 32 in a triangle such that an inter-distance D2 between respective shields 61 becomes, for example, approximately 70 mm. In this embodiment of the invention as described above, one of arresters 32 which is of the neutral phase and one of cable heads 30 which is of the neutral phase are counter-positioned on the circle virtually drawn within the line side unit, then one of the remaining cable heads 30 and the other one thereof are arranged on both sides of the neutral phase cable head 30 along the same virtual circle, and also the one of the remaining arresters 32 and the other one thereof are arranged on both sides of the neutral phase arrester 32 along the virtual circle. In this case, in order to dispose cable heads 30 having a larger diameter than that of arresters 32, a distance D4 between cable heads 30 is set larger than a distance D2 between arresters 32. A distance between the cable heads 30 arranged on both sides of the neutral phase cable head and the arresters 32 arranged on both sides of the neutral phase arrester is separated by distance D3 in a close proximity from each other. Here, a relation between these distances D1, D2, D3 and D4 is set to be: D4<D1 D3<D2.

By arranging shields 60 of cable heads 30 and shields 61 of the arresters 32 of the three phases on the concentric circle of virtually drawn circle 62, a major diameter of cylindrical container section 25a of line side unit 3 can be minimized. Further, arrestors 32 may be disposed more remotely than D1 from the inner surface of cylindrical container section 25a. As described above, by arranging the neutral phase cable head and the neutral phase arrestor counter-positioned to each other, disposing respective three phase cable heads at each apex of a large triangle and respective three phase arrestors at each apex of a smaller triangle within the line side unit, an adequate insulation distance is ensured to be maintained, and the major diameter of the line side unit 3 which is reduced to be substantially the same as that of circuit breaker unit 2 can be obtained, thereby minimizing an inter-bay space.

Further, the disconnectors are aligned linearly, and their positional relation relative to their associated arrestors 32 is such that two of the disconnectors to be associated with the arrestors 32 of the two phases except for the neutral one disposed on each apex of the triangle remotest from circuit breaker 2 are aligned in close proximity of their associated arrestors 32. These disconnectors are connected with the three phase arrestors 32 and cable heads 30 arranged on the concentric circle by means of the branch conductor provided on conductor 31, respectively. As described hereinabove, because of their concentric arrangements of the three phase cable heads 30 and the three phase arrestors 32, adequate insulation distances of inter-three phase arrestors 32 and/or inter-three phase cable heads 30 are ensured, and the external diameter of the cylindrical container section 25a of the line side unit 3 can be minimized. Further, because of the arrangement both of the cable heads 30 and the arrestors 32 in the lower direction therein, and of the close-proximity arrangement of the same phase cable head 30 and arrestor 32 for the other two phases, a loading factor of the arrestor can be lowered, thereby extending the service life thereof.

In the lower direction under the line side unit 3, a frame structure 37 is provided for supporting the line side unit 3 thereon. Further, a bottom plate 38 is provided under the container of line side unit 3, and a joint section 39 for connection with cable 40 of cable head 30 is taken out from bottom plate 38 through its sealed portion. A current transformer 41 is attached to this cable 40. A monitoring device 42 is attached to frame structure 37, and earth line 43 which is taken out from under the arrestor 32 is connected to this monitoring device 42. As the earth line 43 is taken out from under the arrestor 32, the length of earth line 43 can be minimized so that a potential to be imposed on the operating potential of arrestor 32 can be minimized. As a result, the arrestor 32 can be operated precisely at its operating potential.

FIELD OF INDUSTRIAL APPLICATIONS

As described heretofore, because the height of the line side unit can be lowered according to the invention, a compact-sized gas insulated switchgear can be provided. Also, because of the provision of a wider bottom space under the line side unit, a work space for installing the current transformer in the field can be secured. Further, because of the arrangement of the cable heads on the opposite side from the circuit breaker unit, it becomes easier to install the current transformer and the like.

Still further, because of the arrangement of the same phase arrestor and cable head in close proximity the loading factor of the arrestor can be reduced thereby extending the service life thereof.

Furthermore, by accommodation of the monitoring device and the earth line of the arrestors in the space directly below the sealed tank of the line side unit, the length of the earthing line can be minimized. Therefore, it becomes possible to reduce the cost of the earth line as well as to prevent an increase of the operating potential of the arrestor due to an impedance of the earth line.

In use of the disengaging device of the arrestor, the disengaging device and the sealed terminal can be shared so as to reduce the number of components.

What is claimed is:

1. A gas-insulated switchgear having a bus bar unit, a circuit breaker unit and a line side unit, wherein said line side unit comprises: arresters which are disposed in a lower section thereof and near to said circuit breaker unit; cable heads which are disposed more remote from said circuit breaker unit than said arresters; line side disconnectors which are disposed in an upper section thereof; and a potential transformer which is disposed in an upper section thereof, and wherein said arresters and said cable heads are arranged concentrically in said line side unit.

2. A gas-insulated switchgear having a bus bar unit, a circuit breaker unit and a line side unit, wherein said line side unit comprises: line side disconnectors, arresters, a potential transformer, and cable heads therein, wherein three phase circuit breakers within said circuit breaker unit are aligned in a linear direction, and wherein a surface section of an exhaust cylinder of each of said three phase circuit breakers in a linearly aligned direction is formed flat, said surface sections being on sides of said circuit breakers adjacent to each other.

3. A gas-insulated switchgear having a bus bar unit, a circuit breaker unit and a line side unit, wherein said line side unit comprises: arresters and cable heads which are disposed in a lower section therein; and line side disconnectors and a potential transformer which are disposed in an upper section therein, wherein said arresters and cable heads are connected to circuit breakers in said circuit breaker unit via insulation spacers, and wherein said line side disconnectors are positioned above said arresters and are aligned linearly and disposed between said insulation spacer and said arresters.

4. A gas-insulated switchgear according to claim 1, wherein earthing devices are arranged linearly in an upper direction from said cable heads, and the potential transformer is disposed above said earthing devices.

5. A gas-insulated switchgear according to claim 1, wherein said arresters and said cable heads are arranged equidistant from an internal surface of a container of the line side unit.

6. A gas-insulated switchgear according to claim 1, wherein a cable head and an arrester of a same phase are disposed in close proximity to each other.

7. A gas-insulated switchgear having a bus bar unit, a circuit breaker unit and a line side unit, wherein said line side unit comprises: arresters which are disposed in a lower section thereof and near to said circuit breaker unit; cable heads which are disposed more remote from said circuit breaker unit than said arresters; line side disconnectors which are disposed in an upper section thereof; and a potential transformer which is disposed in an upper section thereof, and wherein said arresters and said cable heads are arranged concentrically in said line side unit; and wherein an earth line of said arrester and a monitoring device are disposed in a lower section under said line side unit.

8. A gas-insulated switchgear having a line side unit, said line side unit comprising: three phase arresters and three phase cable heads which are accommodated in a lower section therein; and line side disconnectors and a potential transformer which are accommodated in an upper section therein, wherein a neutral arrester and a neutral cable head are counter-positioned to each other and the other two arresters are arranged on both sides of the neutral phase arrester such that each arrester is positioned at each apex of a first triangle, and the other two cable heads are arranged on both sides of the neutral phase cable head such that a cable head is positioned at each apex of a second triangle, and wherein said second triangle is formed larger than said first triangle.

9. A gas-insulated switchgear having a line side unit, said line side unit comprising: three phase arresters and three phase cable heads accommodated in a lower section therein; and line side disconnectors and a potential transformer accommodated in an upper section therein, wherein said arresters and said cable heads are arranged on a circle virtually drawn within said line side unit in such a manner that a neutral phase arrester and a neutral phase cable head are disposed in a counter-position to each other on said circle, and that another phase cable head and the other phase cable head are arranged on both sides of the neutral phase cable head, and another phase arrester and the other phase arrester are arranged on both sides of the neutral phase arrester, respectively.

10. A gas-insulated switchgear according to claim 9, wherein said three phase cable heads and said three phase arresters are arranged on apexes of respective triangles, and wherein a triangle of said three phase cable heads is formed larger than a triangle of said three phase arresters.

* * * * *